US008886188B2

(12) United States Patent
Tinnakornsrisuphap et al.

(10) Patent No.: US 8,886,188 B2
(45) Date of Patent: Nov. 11, 2014

(54) METHOD AND APPARATUS FOR TRANSFER OF SESSION REFERENCE NETWORK CONTROLLER

(75) Inventors: Peerapol Tinnakornsrisuphap, San Diego, CA (US); David R. Mazik, Howell, NJ (US); Fatih Ulupinar, San Diego, CA (US); Parag Arun Agashe, San Diego, CA (US); Ravindra Patwardhan, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 946 days.

(21) Appl. No.: 12/051,710

(22) Filed: Mar. 19, 2008

(65) Prior Publication Data

US 2008/0261598 A1 Oct. 23, 2008

Related U.S. Application Data

(60) Provisional application No. 60/895,930, filed on Mar. 20, 2007, provisional application No. 60/945,067, filed on Jun. 19, 2007.

(51) Int. Cl.
*H04W 4/00* (2009.01)
*H04W 92/22* (2009.01)
*H04W 84/04* (2009.01)
*H04W 8/26* (2009.01)
*H04W 36/10* (2009.01)

(52) U.S. Cl.
CPC .............. *H04W 92/22* (2013.01); *H04W 84/04* (2013.01); *H04W 8/26* (2013.01); *H04W 36/10* (2013.01)
USPC .......................................... 455/436; 370/331

(58) Field of Classification Search
CPC . H04W 36/12; H04W 36/02; H04W 36/0033; H04W 88/182; H04W 88/16; H04W 80/04; H04W 8/14
USPC .................. 455/436; 370/342, 331, 328, 338; 709/227, 228
See application file for complete search history.

(56) References Cited

U.S. PATENT DOCUMENTS 6,542,476 B1 * 4/2003 Elizondo et al. .............. 370/278
7,103,662 B2 9/2006 Ray et al.
(Continued)

FOREIGN PATENT DOCUMENTS

| JP | 2008502217 A | 1/2008 |
|---|---|---|
| KR | 20040078750 A | 9/2004 |
| RU | 2216125 C2 | 11/2003 |
| TW | 200308170 | 12/2003 |
| WO | WO9909774 A1 | 2/1999 |

(Continued)

OTHER PUBLICATIONS

International Search Report, PCT/US2008/057651—International Search Authority—European Patent Office—Nov. 6, 2008.

(Continued)

*Primary Examiner* — Nizar Sivji
(74) *Attorney, Agent, or Firm* — Tyler J. Overall

(57) ABSTRACT

Systems and methods of decoupling session management from connection management of a wireless network by enabling transfer of a session between session controllers. A session transfer component transfers ownership of a session from a source session controller to a target session controller, wherein the session transfer does not necessarily require moving the associated connections therewith. Such transfer employs a Unicast Access Terminal Identifier (UATI) that is updated to inform the related base stations regarding transfer of the session.

30 Claims, 13 Drawing Sheets

(56) References Cited

U.S. PATENT DOCUMENTS

| | | |
|---|---|---|
| 2002/0196749 A1 | 12/2002 | Eyuboglu et al. |
| 2004/0018841 A1* | 1/2004 | Trossen .................. 455/436 |
| 2006/0274692 A1* | 12/2006 | Ryu ..................... 370/331 |
| 2006/0291420 A1 | 12/2006 | Ng |
| 2007/0143483 A1* | 6/2007 | Lim et al. ............. 709/227 |
| 2007/0153751 A1* | 7/2007 | Svensson et al. ........ 370/338 |
| 2007/0230401 A1* | 10/2007 | Rayzman et al. ........ 370/331 |
| 2007/0254661 A1* | 11/2007 | Chowdhury et al. ..... 455/436 |
| 2009/0022104 A1* | 1/2009 | Cherian et al. .......... 370/331 |

FOREIGN PATENT DOCUMENTS

| | | |
|---|---|---|
| WO | 2004079947 | 9/2004 |
| WO | WO2005119990 | 12/2005 |
| WO | 2006110021 | 10/2006 |
| WO | 2007143738 | 12/2007 |

OTHER PUBLICATIONS

Written Opinion, PCT/US2008/057651—International Search Authority—European Patent Office—Nov. 6, 2008.

Taiwan Search Report—TW097109919—TIPO—Sep. 19, 2011.

* cited by examiner

METHOD AND APPARATUS FOR TRANSFER OF SESSION REFERENCE NETWORK CONTROLLER

CLAIM OF PRIORITY UNDER 35 U.S.C. §119

The present application for patent claims priority to Provisional Application No. 60/895,930 entitled "METHOD FOR TRANSFERRING SESSIONS REFERENCE CONTROLLER IN DISTRIBUTED RADIO ACCESS NETWORKS" filed on Mar. 20, 2007, and Provisional Application No. 60/945,067 entitled "METHOD AND APPARATUS FOR IAS INTERFACE MESSAGE" filed on Jun. 19, 2007, both applications assigned to the assignee hereof and hereby expressly incorporated by reference herein.

BACKGROUND

1. Field

The following description relates generally to wireless communications, and more particularly to methods and apparatus for transfer of session ownership between network entities.

2. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

In particular, as the evolution of wireless technologies continues to advance, the progression of mobile services will continue to evolve into ever-richer, more compelling mobile and converged services. With end users demanding more and higher-quality multimedia content in all environments, the evolution of device technologies will continue to enhance the increasing consumption of data usage. For example, over the last several years, wireless communications technologies have evolved from analog-driven systems to digital systems. Typically in conventional analog systems, the analog signals are relayed on a forward link and a reverse link and require a significant amount of bandwidth to enable signals to be transmitted and received while being associated with suitable quality. As the analog signals are continuous in time and space, no status messages (e.g., messages indicating receipt or non-receipt of data) are generated. In contrast, packet-switched systems allow analog signals to be converted to data packets and transmitted by way of a physical channel between an access terminal and a base station, router, and the like. In addition, digital data can be relayed in its natural form (e.g., text, Internet data, and the like) via employing a packet switched network.

As such, digital wireless communication systems are widely deployed to provide various communication services such as telephony, video, data, messaging, broadcasts, and the like. Such systems commonly employ an access network that connects multiple access terminals to a wide area network (WAN) by sharing the available network resources. The access network is typically implemented with multiple access points dispersed throughout a geographic coverage region. Moreover, the geographic coverage region can be divided into cells with an access point in each cell. Likewise, the cell can be further divided into sectors. However, in such system architecture supplying session information and paging management to a moving AT becomes a challenging task.

SUMMARY

The following presents a simplified summary in order to provide a basic understanding of the described aspects. This summary is not an extensive overview and is intended to neither identify key or critical elements nor delineate the scope of such aspects. Its purpose is to present some concepts of the described aspects in a simplified form as a prelude to the more detailed description that is presented later.

The described aspects provide for transfer of a communication session from a source session controller (e.g., a source Session Reference Network Controller—SRNC) to a target session controller (e.g., a target SRNC)—via a session transfer component, and enable decoupling of session management from connection management of wireless networks. Accordingly, session management becomes independent of connection management, wherein if a session is to be transferred, such does not necessarily require moving the associated connection therewith. Such is in contrast to conventional systems that require the connection to be moved if the session is moved, which can further induce interruptions. Hence, the described aspects provide for transfer of a session without interruption of the data stream between the AT and the wireless communication system.

In general, a connection represents an assignment of resources (e.g., dedicated resources) that allow an Access Terminal (AT) to communicate with an Access Network (AN). Likewise, a session represents a collection of configurations, attributes or parameters negotiated between the AT and the AN (e.g., Quality of Service configurations), wherein the session controller retains the authority on such configurations. Communications between base station and the AT is based on the configurations maintained in the session controller, wherein a base station needs to obtain such configuration from the session controller, before communicating with the AT. The connection is maintained independently of the session state, wherein the base stations (and not the session controller) control the connection.

The session and the AT can be identified to base stations based on a Unicast Access Terminal Identifier (UATI), wherein session signatures can further designate the version of the session for the AT. Such identification by session signatures can be based on a sequence of numbers that can be incremented, when the session is updated, e.g., a session can be modified upon initiation of a new application that requires additional resources.

Based on such updates, base station that receives the UATI can clearly and unambiguously locate the session controller (e.g., target SRNC), which now manages the session to retrieve session information. It is to be appreciated that a base station can re-negotiate the session if session information is not desirable.

In a related aspect, the transfer of the SRNC occurs without interruption to stream of data communicated between the AT and base stations, regardless of which SRNC is chosen. Moreover, the AT can recognize each base station and can communicate directly therewith, wherein the SRNC can act as the coordinator of negotiations that the AT has conducted with such base stations. The SRNC typically includes authentication functions and associated configurations—which are negotiated between base station(s) and access terminals(s), and functions as a reference for base stations to retrieve information (e.g., obtain session information to avoid conflicts during session change.) The source SRNC can also hold the reference copy of the session and perform paging controller function. SRNC can be located using the UATI of the AT. In a related aspect, the session transfer component can robustly transfer SRNC to another entity, while at the same time another AN is being added into the active set or session negotiation.

According to a methodology, initially a source SRNC and a target SRNC are positioned in a route set for exchange of messages (e.g., have been set up for communication). Subsequently, a message related to an SRNC transfer request can be sent to the source SRNC from the target SRNC. The source SRNC can then supply UATI sequence numbers (e.g., an increasing number associated with UATI) to signify for base stations the sequence numbers supplied for the target SRNC. Moreover, the target SRNC can supply the updated UATI to the AT. Upon receipt of such message by the AT, it subsequently responds with UATI complete message, to the target SRNC to indicate agreement with updated UATI and transfer to the assigned target SRNC. The target SRNC can then announce to members of route associated therewith (e.g., the source SRNC and the serving eBS) that the UATI has changed and the target SRNC has now taken ownership of the session. Likewise, base stations can change their associated UATI to that of the target SRNC.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
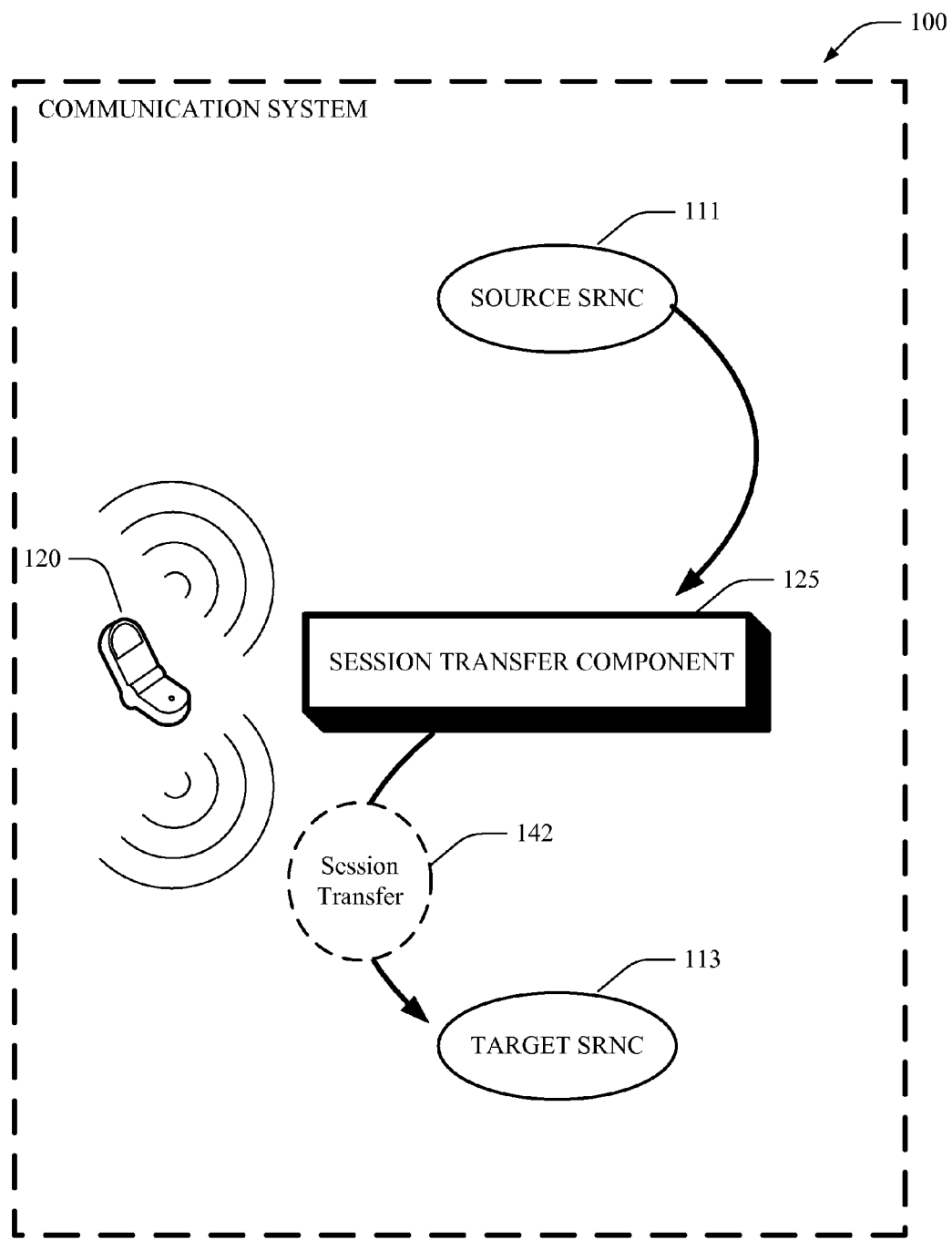
FIG. 1 illustrates an exemplary session transfer component that transfers a session from a source Session Reference Controller (SRNC) to a target SRNC.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, enhanced Base Station (eBS), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates a session transfer component 125 that transfers a session 142 from a source Session Reference Controller 111 (SRNC) to a target SRNC 113. Typically, the source and target SRNC 111, 113 are responsible for maintaining the session reference with the Access Terminal 120 (AT.) Moreover, such source SRNC 111 and target SRNC 113 can support idle state management of the AT 120, and provide paging control functions when the AT 120 is idle. In one aspect, the SRNC 111, 113 contains a Session Anchor route for each AT 120 it is supporting. Moreover, Access Gateway (AGW) selection can be performed by the SRNC 111, 113 for the AT 120. In addition, an SRNC can assume the Data Attachment Point SRNC function to establish a Signaling-Only binding with the AGW when the AT is idle. The SRNC can also function as the authenticator for access authentication.

As illustrated in FIG. 1, the session transfer component 125 transfers ownership of a session 142 from the source SRNC 111 to the target SRNC 113, wherein associated Unicast Access Terminal Identifier (UATI) can then be updated to designate such transfer to the related base station(s). Accordingly, session management becomes independent of connection management, wherein if a session is to be moved, such does not necessarily require moving the associated connection therewith. Such is in contrast to conventional systems that require the connection to be moved if the session is moved, which can further induce interruptions. Communications between base station (not shown) and the AT 120 is based on the configurations maintained in the session controller, wherein a base station needs to obtain such configuration from the session controller, before communicating with the AT. The session and the AT 120 can be identified to base stations based on a Unicast AccessTerminal Identifier (UATI), wherein session signatures can further designate the version of the session for the AT. Such identification by session signatures can be based on a sequence of numbers that can be incremented, when the session is updated, e.g., a session can be modified upon initiation of a new application that requires additional resources.

Based on such updates, a base station that receives the UATI can clearly and unambiguously locate the target SRNC 111, which now manages the session to retrieve session information. It is to be appreciated that a base station can renegotiate the session if session information is not desirable. The UATI may include a subnet identifier segment (e.g., having a size of 8 bits) and an AT identifier portion having a predetermined size (e.g., 24 bits.). It may also include the IP address of the SRNC for the AT 120. Accordingly, when the AT system moves (e.g., from a source subnet to a target subnet) a target SRNC can be identified from UATI, and a session is referred or located thereafter by updated or a new UATI. It is to be appreciated that even though FIG. 1 illustrates the session transfer component as a single unit, such unit can be in a distributed from throughout the system. Moreover, the paging processes during session transfer can be performed by using both an old page ID (e.g., assigned by the source session controller to the AT) and a new Page ID (e.g., assigned to the AT by the target SRNC), and before the new UATI has been confirmed from the AT.

Figure 2:
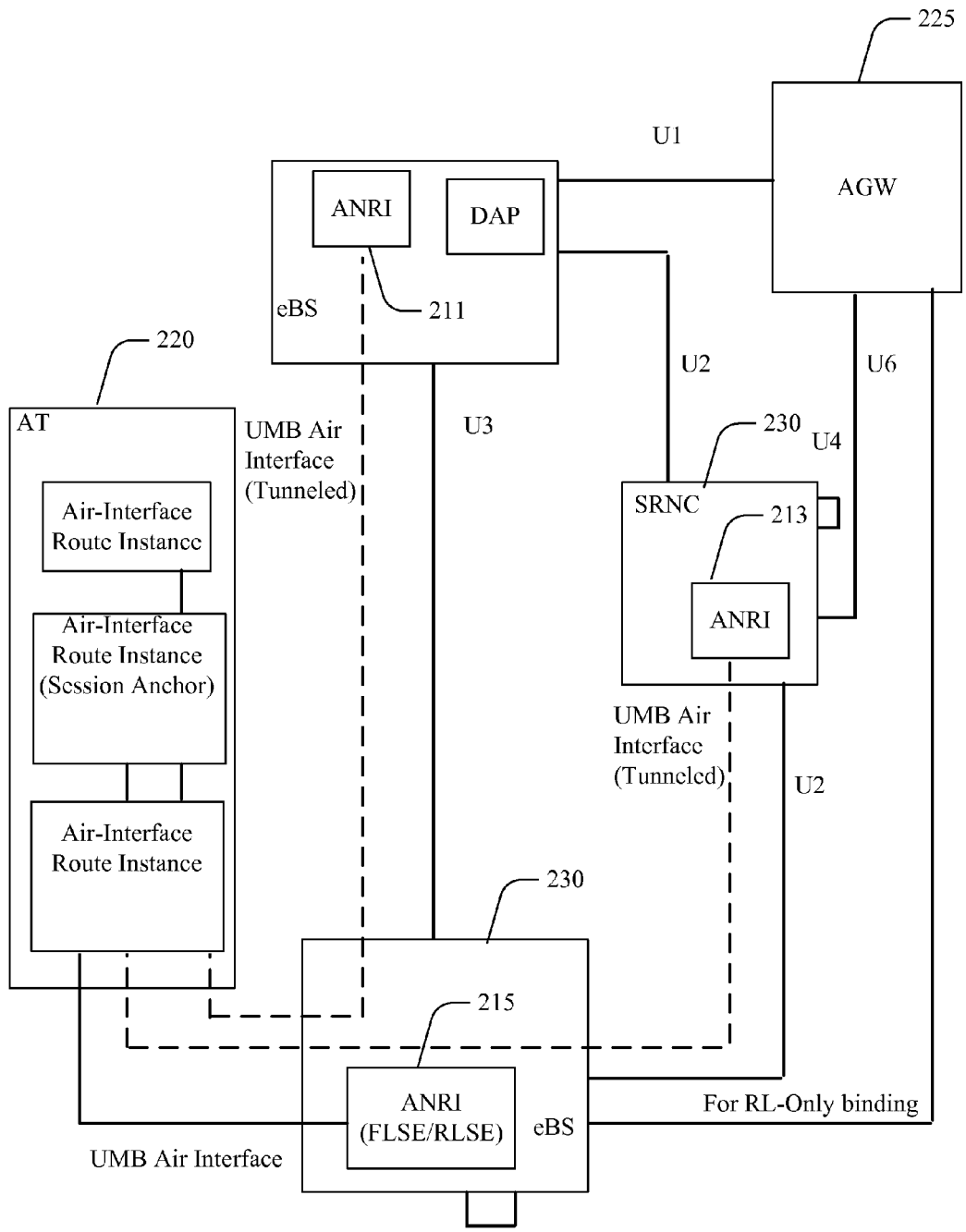
FIG. 2 illustrates an exemplary system for SRNC transfer, which includes Access Networks in form of a functional entity that contains AN Route Instance (ANRI) for logically communicating with the Access Terminal (AT).

FIG. 2 illustrates an exemplary system SRNC transfer that includes Access Networks in form of a functional entity that contains AN Route Instance (ANRI) 211, 213, 215 for logically communicating with the Access Terminal (AT) 220. Communication by an ANRI that is not currently serving the AT 220 on a forward or reverse radio link is accomplished logically by tunneling UMB Route Protocol Packets through the Forward Link Serving eBS (FLSE) and Reverse-Link Serving eBS (RLSE). The SRNC 230 can have a route with the AT 220, wherein the SRNC 230 can communicate transparently with other base stations. In one aspect transfer of a session occurs without interruption of the data stream between the AT and the wireless communication system. Moreover, the AT 220 can recognize each base station and can communicate directly therewith, wherein the SRNC can act as the coordinator of negotiations that the AT has conducted with such base stations.

As illustrated in FIG. 2, the Access Gateway (AGW) 225 provides the "point of IP attachment" to the Packet Data network for ATs. Accordingly, the AGW 225 is effectively the first-hop router for the AT 220, wherein the AGW 225 can consist of Control-plane (C-plane) to handle signaling messages between eBS/SRNC and the AGW, and User-plan (U-plane) to handle bearer traffic. C-plane and U-plane may have different IP endpoint. The transfer component moves the SRNC from one entity to another entity.

The source SRNC can also hold the reference copy of the session and perform paging controller function. SRNC can be located using the UATI of the AT 220. For example, IP address of the SRNC may be embedded as part of the UATI. The transfer component robustly transfers SRNC to another entity that can happen at the same time that another AN is being added. Accordingly, the transfer component transfers ownership of a session from a source SRNC to a target SRNC, wherein associated Unicast Access Terminal Identifier (UATI) can then be updated to designate such transfer to base stations.

The session and the AT can be identified to base stations based on a Unicast AccessTerminal Identifier (UATI), wherein session signatures can further designate the version of the session for the AT. Based on such updates, a bases station that receives the UATI can clearly and unambiguously locate the target SRNC, which now manages the session reference, to retrieve session information. It is to be appreciated that a base station can re-negotiate the session if session information is not desirable. As illustrated in FIG. 2, the U1 reference point carries control and bearer information between the eBS and the AGW. Likewise, the U2 reference point carries control information between the SRNC and eBS; and the U3 reference point carries control and bearer information between two eBSs. Moreover, The U4 reference point carries control information between SRNCs. Furthermore, the U6 reference point carries control information between the SRNC and AGW.

Figure 3:
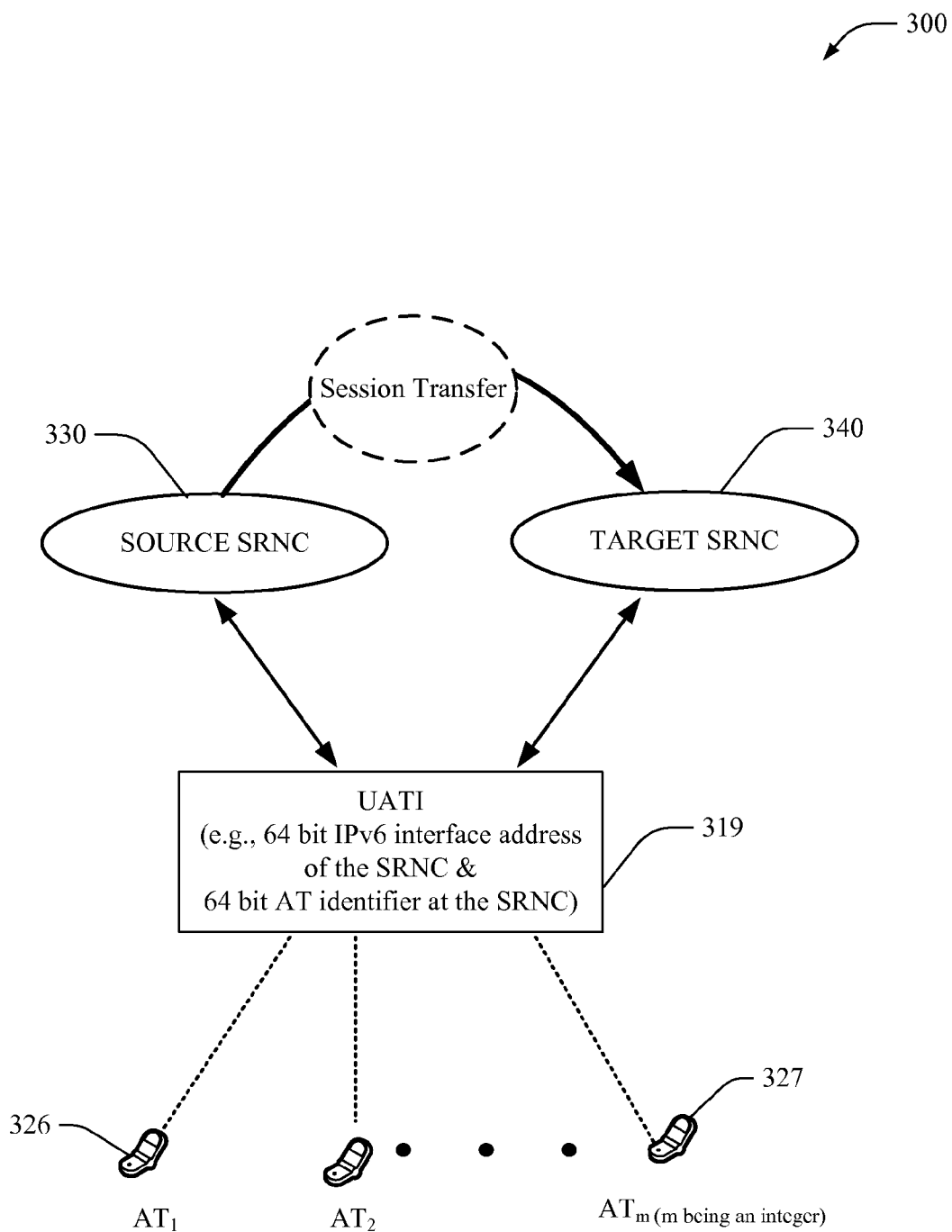
FIG. 3 illustrates an exemplary Unicast Access Terminal Identifier (UATI) that is updatable to designate a transfer to base stations.

FIG. 3 illustrates an exemplary Unicast Access Terminal Identifier (UATI) 319 that is updatable to designate transfer of the AT from one base station to another base station, as part of a communication system 300. The UATI serves as a temporary identifier to identify the AT and the associated SRNC serving the AT. For example, the UATI 319 can be employed in messages transmitted over the air interface between the mobile station 326 327, the AN, target SRNC 340 or source SRNC 330. As illustrated in FIG. 3, the UATI 319 can include a predetermined number of bits (e.g., 24 bits that includes an 8-bit prefix for the AN, and a 16-bit SRNC identifier.) It is to be appreciated that such arrangement is exemplary in nature and other arrangements are well within the realm of the subject innovation.

Moreover, additional frame preambles can be employed followed by a series of frames. Further acquisition information such as timing and other information sufficient for an access terminal to communicate on one of the carriers and basic power control or offset information may also be included in the superframe preamble. In other cases, only some of the above and/or other information can be included in the frame preamble and or subframes. Moreover, each frame can further identify a number of subcarriers that can simultaneously utilized for transmission over some defined period.

In a related aspect, such transfer of the SRNC via updatable UATIs can occur without interruption of the data stream between the AT 326, 327 and the wireless communication system. Moreover, the AT 326, 327 can recognize each base station and can communicate directly therewith, wherein the SRNC can act as the coordinator of negotiations that the AT has conducted with such base stations.

Figure 4:
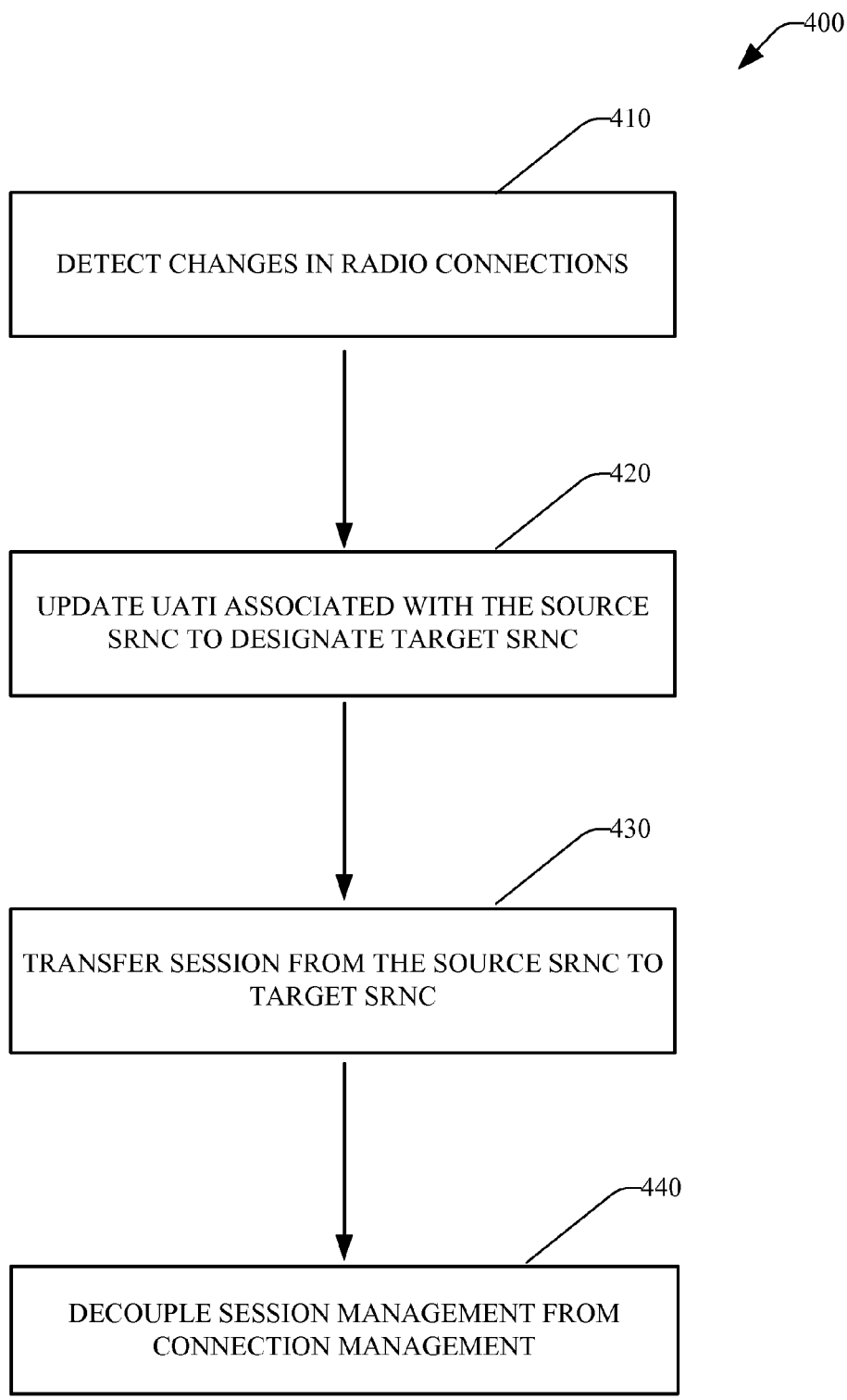
FIG. 4 illustrates a related methodology of transferring a state to a target SRNC according to an aspect.

FIG. 4 illustrates a related methodology 400 of transferring a session from a source SRNC to a target SRNC according to an aspect. While the exemplary method is illustrated and described herein as a series of blocks representative of various events and/or acts, the various aspects is not limited by the illustrated ordering of such blocks. For instance, some acts or events may occur in different orders and/or concurrently with other acts or events, apart from the ordering illustrated herein, in accordance with the various aspects described herein. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, changes in the base station serving the AT can be detected, which prompt a change between a source SRNC and a target SRNC. Next and at 420 UATI associated with the source SRNC can be updated to designate the target SRNC. At 430, a session can transfer ownership from the source SRNC to the target SRNC. Such transfer of ownership from the source SRNC to the target SRNC supplies decoupling of management of the session from connection management of the session at 440. Accordingly, session management becomes independent of connection management, wherein if a session is to be moved, such does not necessarily require moving the associated connection therewith. Such is in contrast to conventional systems that require the connection to be moved if the session is moved, which can further induce interruptions.

Figure 5:
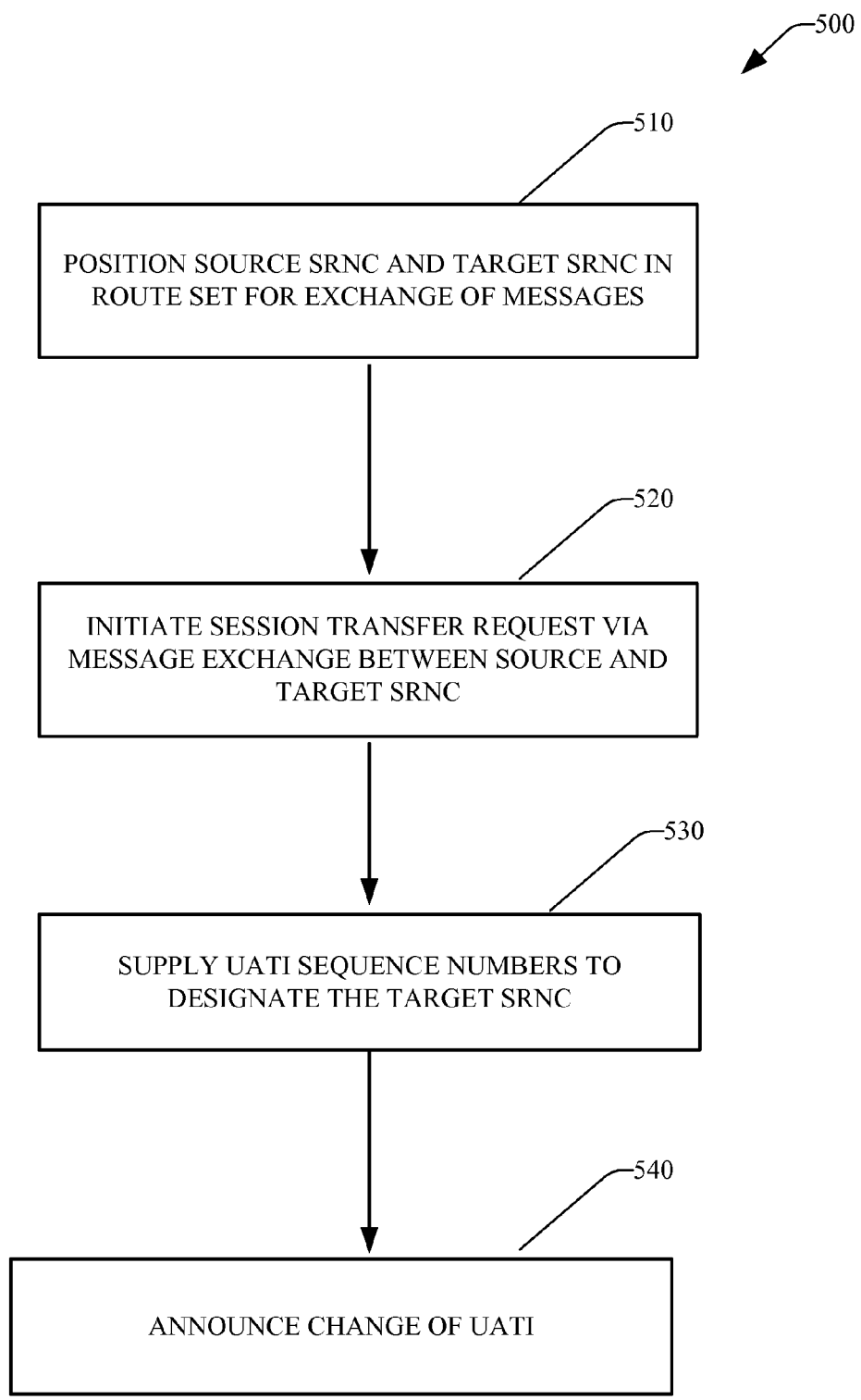
FIG. 5 illustrates a further methodology of transferring ownership of a session from a source SRNC to a target SRNC according to an aspect.

FIG. 5 illustrates a further methodology 500 of transferring ownership of a session from a source SRNC to a target SRNC according to an aspect. Initially and at 510, a source SRNC and a target SRNC are positioned in a route set for exchange of messages. Subsequently and at 520, a message related to an SRNC transfer request can be sent to the source SRNC from the target SRNC. At 530, the source SRNC can then supply UATI sequence numbers (e.g., an increasing number associated with UATI) and signify for base stations the sequence numbers supplied for the target SRNC. Moreover, the target SRNC can supply the updated UATI to the AT. Upon receipt of such message by the AT, it subsequently responds with UATI complete message to the target SRNC to indicate agreement with updated UATI and transfer to the assigned target SRNC. At 540, the target SRNC can then announce to members of route associated therewith (e.g., the source SRNC and the serving eBS) that the UATI has changed and the target SRNC has now taken ownership of the session. Likewise, base stations can change their associated UATI to that of the target SRNC.

Figure 6:
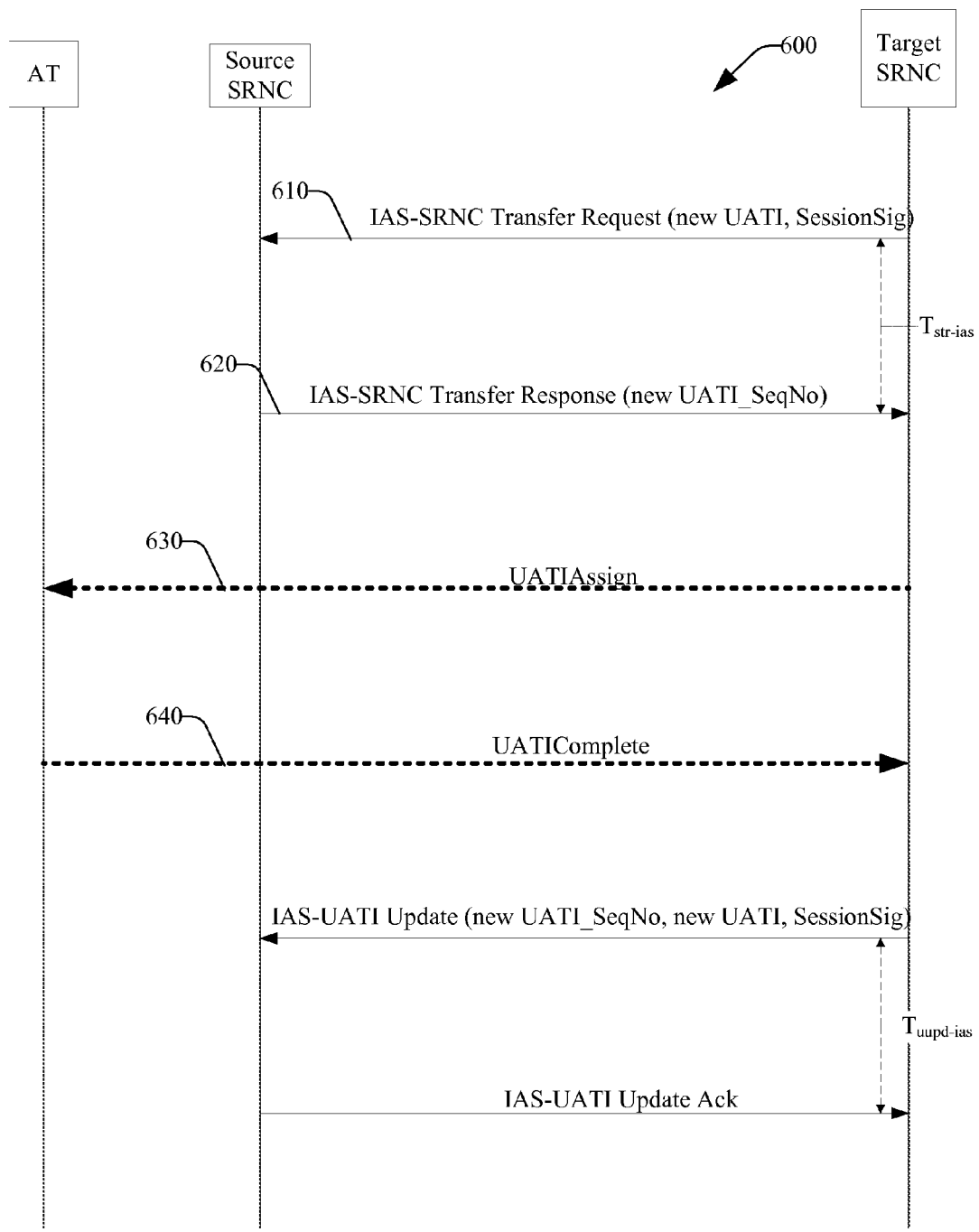
FIG. 6 illustrates an exemplary call flow of SRNC transfer according to a further aspect, wherein it can be assumed that the source SRNC and the target SRNC are already in the Route Set.

FIG. 6 illustrates an exemplary call flow 600 of SRNC transfer according to a further aspect, wherein it can be assumed that the source SRNC and the target SRNC are already in the Route Set (e.g., communicate with each other). As illustrated, initially and at 610, the target SRNC sends an Inter-Access Network Signaling (IAS)-SRNC Transfer Request message to the source SRNC to request a session reference transfer and starts timer $T_{str\text{-}ias}$. Such timers are employed to increase reliability of the message exchange procedures.

Subsequently, and at 620, the source SRNC responds to the target SRNC with an IAS-SRNC Transfer Response message. Such message includes a new UATI_SeqNo (for the new UATI). Once the source SRNC sends the IAS-SRNC Transfer Response message, a session associated therewith can be locked. Such session locking can include rejects of any further session modification—and yet still acceptance request for a copy of the session and also request to page the AT. Upon receipt of the IAS-SRNC Transfer Response message, the target SRNC halts timer $T_{str\text{-}ias}$. The target SRNC can also lock its session.

At 630, the target SRNC sends UATIAssign message containing the new UATI to the AT. Subsequently and at 640, upon receipt of the UATIAssign message, the AT sends UATI-Complete messages to the target SRNC. Upon receipt of the UATIComplete message or signaling message addressed to the new UATI, the target SRNC unlocks its session, e.g., it allows session configuration, and sends IAS-UATI Update message to all ANRIs in the Route Set.

Next and at 640, upon receipt of the IAS-UATI Update message with a new UATI_SeqNo, the source SRNC releases the old UATI and sends IAS-UATI Update Ack message back to the target SRNC. Upon receipt of the IAS-UATI Update Ack message, the target SRNC unlocks the session and stops timer $T_{uupd\text{-}ias}$.

Figure 7:
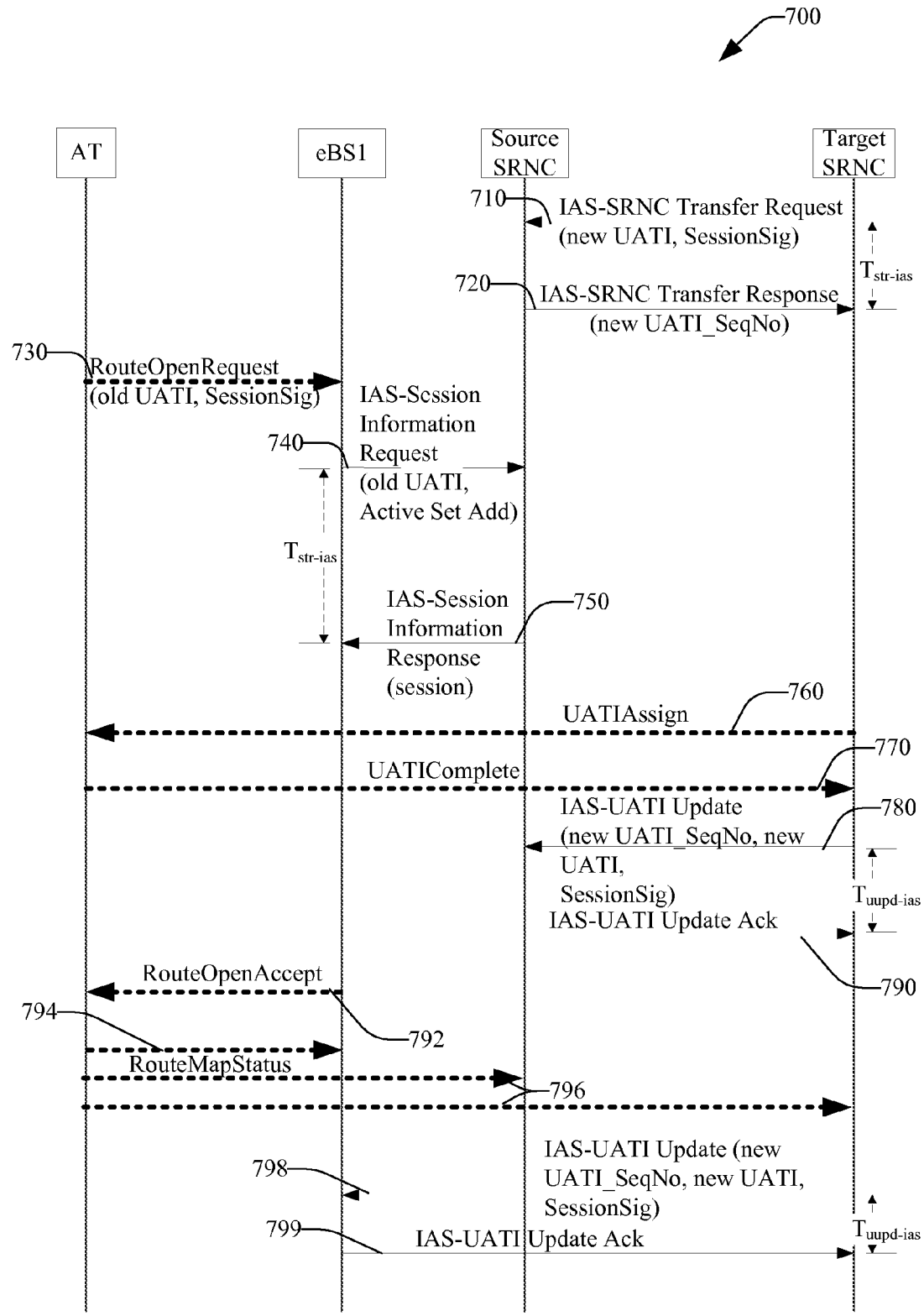
FIG. 7 illustrates a call flow when Route Set Add occurs during a session reference transfer.

FIG. 7 illustrates a call flow 700 when Route Set Add occurs during a session reference transfer. Such call flow 700 assumes that the source SRNC and the target SRNC are already in the Route Set while eBS1 is not in the Route Set yet. Initially and at 710, the target SRNC sends an IAS-SRNC Transfer Request message to the source SRNC to request a session reference transfer and starts timer $T_{str-ias}$.

Next and at 720 the source SRNC locks its session and responds to the target SRNC with an IAS-SRNC Transfer Response message. Such message includes the new UATI_SeqNo (for the new UATI). Upon receipt of the IAS-SRNC Transfer Response message, the target SRNC stops timer $T_{str-ias}$.

Subsequently and at 730 the target SRNC sends a UATIAssign message containing the new UATI to the AT. However, before the message is received at the AT, the AT sends RouteOpenRequest message to the eBS1 with old UATI to add the eBS1 into the Route Set. At 740, eBS1 sends an IAS-Session Information Request message addressing the old UATI, to the source SRNC with a flag indicating this is for Route Set Add and starts timer $T_{sir-ias}$.

At 750, the source SRNC accepts the request for session by sending an IAS-Session Information Response message with the session information. Upon receipt of the IAS-Session Information Response message, the eBS1 stops timer $T_{sir-ias}$.

Subsequently, at 760, the AT receives the UATIAssign message from the target SRNC. Next, at 770, upon receipt of the UATIAssign message, the AT sends UATIComplete message to the target SRNC. As such and upon receipt of the UATIComplete message or a signaling message addressed to the new UATI, the target SRNC unlocks its session, wherein session configuration can be enabled, and sends IAS-UATI Update message to all ANRIs in the Route Set.

At 780, the target SRNC sends an IAS-UATI Update message with the new UATI and the new UATI_SeqNo to the source SRNC and starts timer $T_{uupd-ias}$.

Moreover, at 790, upon receipt of the IAS-UATI Update message, the source SRNC releases the old UATI and sends an IAS-UATI Update Ack message back to the target SRNC. Upon receipt of the IAS-UATI Update Ack message, the target SRNC stops timer $T_{uupd-ias}$. At 792, the AT receives a RouteOpenAccept message from eBS1 in response to the RouteOpenRequest message in act 730. Subsequently, at 794, the AT sends RouteMapStatus message to all ANRIs in the Route Set, including the target SRNC.

Next, at 796, upon receipt of the RouteMapStatus message which contains the new eBS1 in the Route Set, the target SRNC sends IAS-UATI Update message containing the new UATI and the new UATI_SeqNo to eBS1 and starts timer $T_{uupd-ias}$.

Next, at 799, upon receipt of the IAS-UATI Update message, eBS1 sends an IAS-UATI Update Ack message to the target SRNC. Upon receipt of the IAS-UATI Update Ack message, the target SRNC stops timer $T_{uupd-ias}$.

Figure 8:
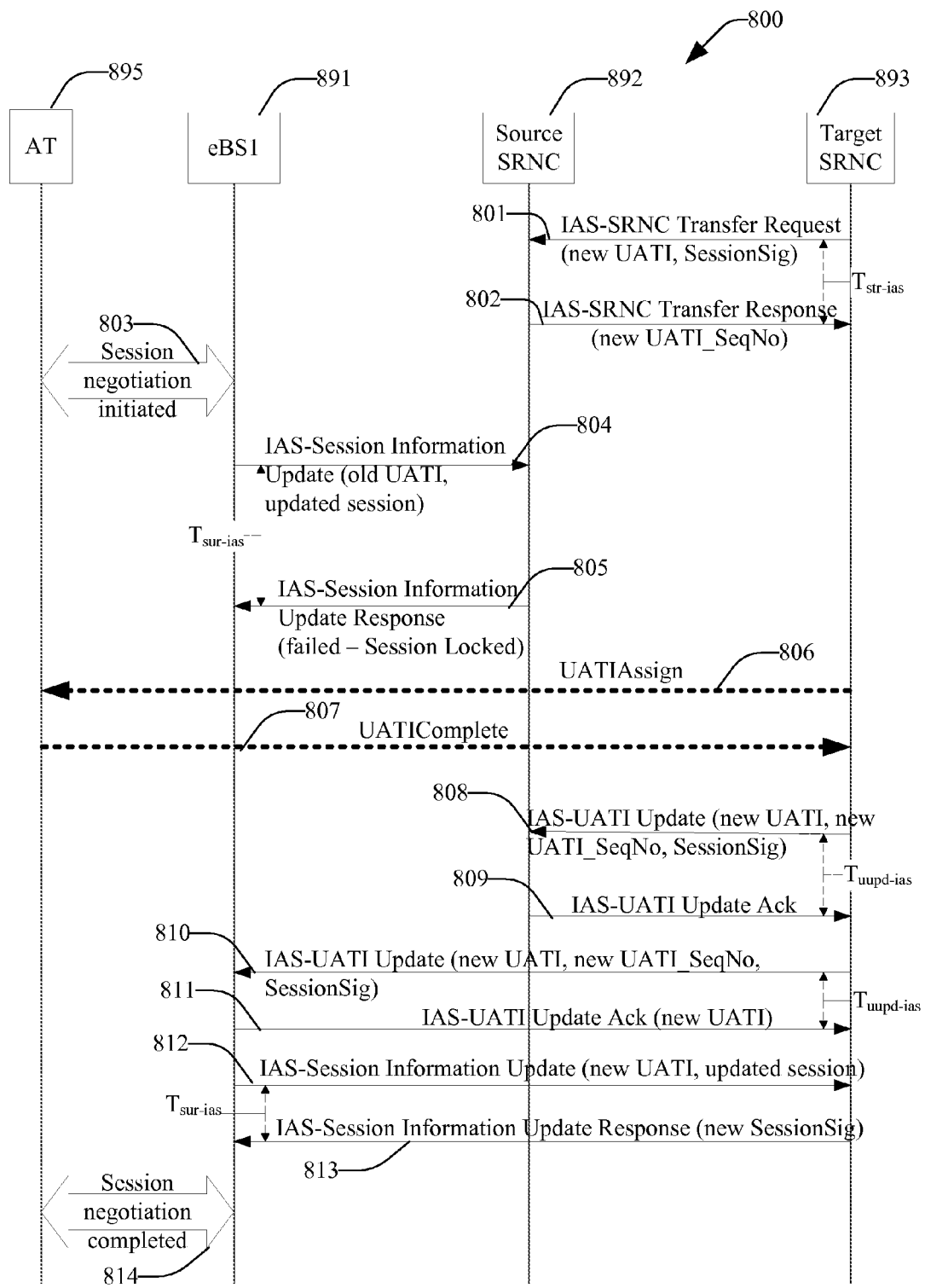
FIG. 8 illustrates a further flowchart for when session negotiation is attempted during a session reference transfer, in accordance with a further aspect.

FIG. 8 illustrates a further flowchart in accordance with a further aspect. Such flowchart describes the call flow when session negotiation is attempted during a session reference transfer. The call flow 800 assumes that eBS1 891, the source SRNC 892 and the target SRNC 893 are already in the Route Set. Initially, at 801, the target SRNC 893 sends an IAS-SRNC Transfer Request message to the source SRNC 892 to request a session reference transfer and starts timer $T_{str-ias}$.

Subsequently, at 802, the source SRNC 892 locks its session and responds to the target SRNC 893 with an IAS-SRNC Transfer Response message. This message includes the new UATI_SeqNo (for the new UATI). Upon receipt of the IAS-Session Information Request message, the target SRNC 893 stops timer $T_{str-ias}$. The target SRNC sends UATIAssign message containing the new UATI to the AT. However, before the message is received at the AT, the AT and eBS1 initiate session negotiation at 803.

Next, at 804, in order to complete session negotiation, eBS1 891 sends IAS-Session Information Update Request message with the old UATI to the source SRNC 892 and starts timer $T_{stir-ias}$. At 805, the source SRNC rejects the request by sending an IAS-Session Information Update Response message to eBS1 891 with the error cause value indicating that the session is locked. Upon receipt of the IAS-Session Information Update Response message, eBS1 stops timer $T_{sir-ias}$ and eBS1 may retry updating the session at the SRNC after it receives an IAS-UATI Update message or may terminate session negotiation with the AT 895. Next, at 806, the AT receives UATIAssign message from the target SRNC.

Subsequently and upon receipt of the UATIAssign message, the AT sends UATIComplete message to the target SRNC at 807. Upon receipt of the UATIComplete message or a signaling message addressed to the new UATI, the target SRNC unlocks its session, wherein, it can allow session configuration, and sends an IAS-UATI Update message to all ANRIs in the Route Set, including the source SRNC and eBS1.

Next, at 808, the target SRNC sends an IAS-UATI Update message with the new UATI to the source SRNC and starts timer $T_{uupd-ias}$. At 809, and upon receipt of the IAS-UATI Update message, the source SRNC releases the old UATI and sends an IAS-UATI Update Ack message back to the target SRNC. Upon receipt of the IAS-UATI Update Ack message, the target SRNC stops timer $T_{uupd-ias}$.

Subsequently, at 810, the target SRNC sends an IAS-UATI Update message with the new UATI to eBS1 and starts timer $T_{uupd-ias}$. At 811, upon receipt of the IAS-UATI Update message, eBS1 uses the new UATI and sends an IAS-UATI Update Ack message back to the target SRNC. Upon receipt of the IAS-UATI Update Ack message, the target SRNC stops timer $T_{uupd-ias}$. Next, at 812, upon receipt of the IAS-UATI Update message, eBS1 sends IAS-Session Update Request message with the new UATI to the target SRNC and starts timer $T_{sur-ias}$.

Subsequently, at 813, the target SRNC accepts the request by sending an IAS-Session Update Response message to eBS1 with the new session signature. Upon receipt of the IAS-Session Update Response message, eBS1 stops timer $T_{stir-ias}$. Accordingly, at 814, eBS1 and the AT complete session negotiation using the new session signature.

Figure 9:
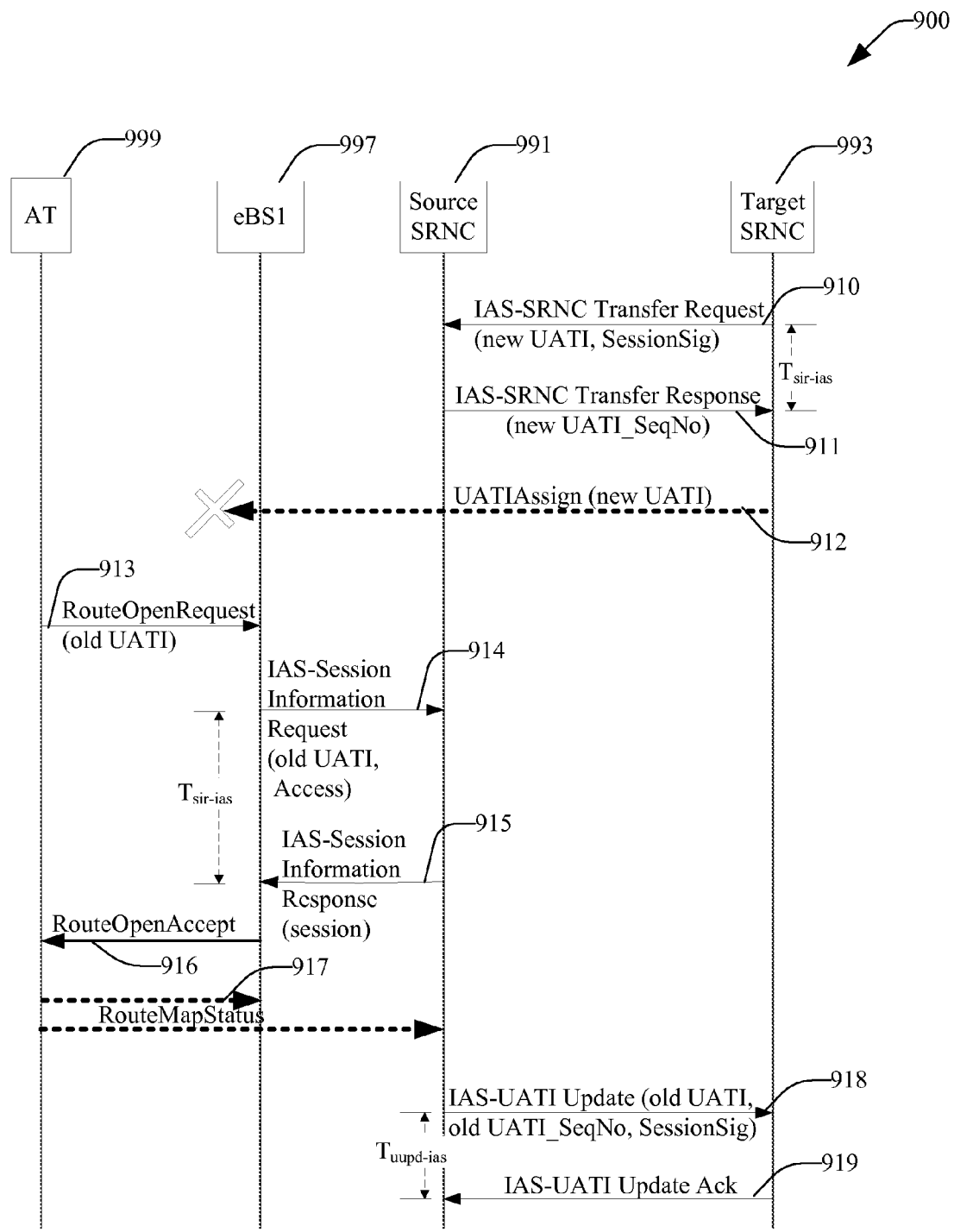
FIG. 9 illustrates a related flow chart that illustrates an exemplary session reference transfer where the AT does not receive the UATIAssign message.

FIG. 9 illustrates a related call flow 900 that illustrates an exemplary session reference transfer where the AT 999 does not receive the UATIAssign message. Such call flow 900 assumes that the source SRNC 991 and the target SRNC 993 are already in the Route Set while eBS1 997 is not yet in the Route Set. Initially, at 910, the target SRNC 993 sends an IAS-SRNC Transfer Request message to the source SRNC 991 to request a session reference transfer and starts timer $T_{str-ias}$.

Next, at 911, the source SRNC 991 responds to the target SRNC 993 with an IAS-SRNC Transfer Response message. This message includes the new UATI_SeqNo (for the new UATI). Upon receipt of the IAS-SRNC Transfer Response message, the target SRNC 993 stops timer $T_{str-ias}$. Subsequently, at 912, the target SRNC 993 sends UATIAssign message containing the new UATI to the AT 999. However, the AT 999 does not receive the message, as it has lost its connection.

During this period, if the source SRNC 991 receives a Paging Request message, then the source SRNC 991 shall initiate a paging procedure for the AT 999 using the old PageID. Likewise, if the UATIComplete message is not received, then the source SRNC and the target SRNC 993 can release the new UATI once its session KeepAlive timer expires. At 913, the AT 999 accesses eBS1 997 by sending a RouteOpenRequest with the old UATI to eBS1 997. Subsequently, at 914, eBSN1 sends an IAS-Session Information Request message to the source SRNC with a flag indicating this is an access and starts timer $T_{sir-ias}$.

Next, at 915, upon receipt of the IAS-Session Information Request message with the old UATI and access flag, the source SRNC unlocks the session and responds to eBS1 with an IAS-Session Information Response message. Such message contains the current session, the current Data Attachment Point (DAP), and the current session signature. Upon receipt of the IAS-Session Information Response message, the eBS1 stops timer $T_{sir-ias}$.

Subsequently, at 916, the eBS1 sends a RouteOpenAccept message to the AT to complete the route setup procedure with the AT. Likewise, at 917, the AT sends a RouteMapStatus to all ANRIs in the Route Set. Next, at 918, upon receipt of the IAS-Session Information Request with the old UATI and access flag, the source SRNC also sends an IAS-UATI Update message to the target SRNC to inform the target SRNC that it may release the new UATI. Then, the source SRNC starts timer $T_{uupd-ias}$.

Subsequently, at 919, upon receipt of the IAS-UATI Update message, the target SRNC releases the new UATI and sends an IAS-UATI Update Ack message back to the source SRNC. Upon receipt of the IAS-UATI Update Ack message, the source SRNC stops timer $T_{uupd-ias}$. Accordingly, the call flow 900 exemplifies a scenario that enables the source controller to recall the session and retain ownership by the source controller, if the UATIAssign message is lost.

Figure 10:
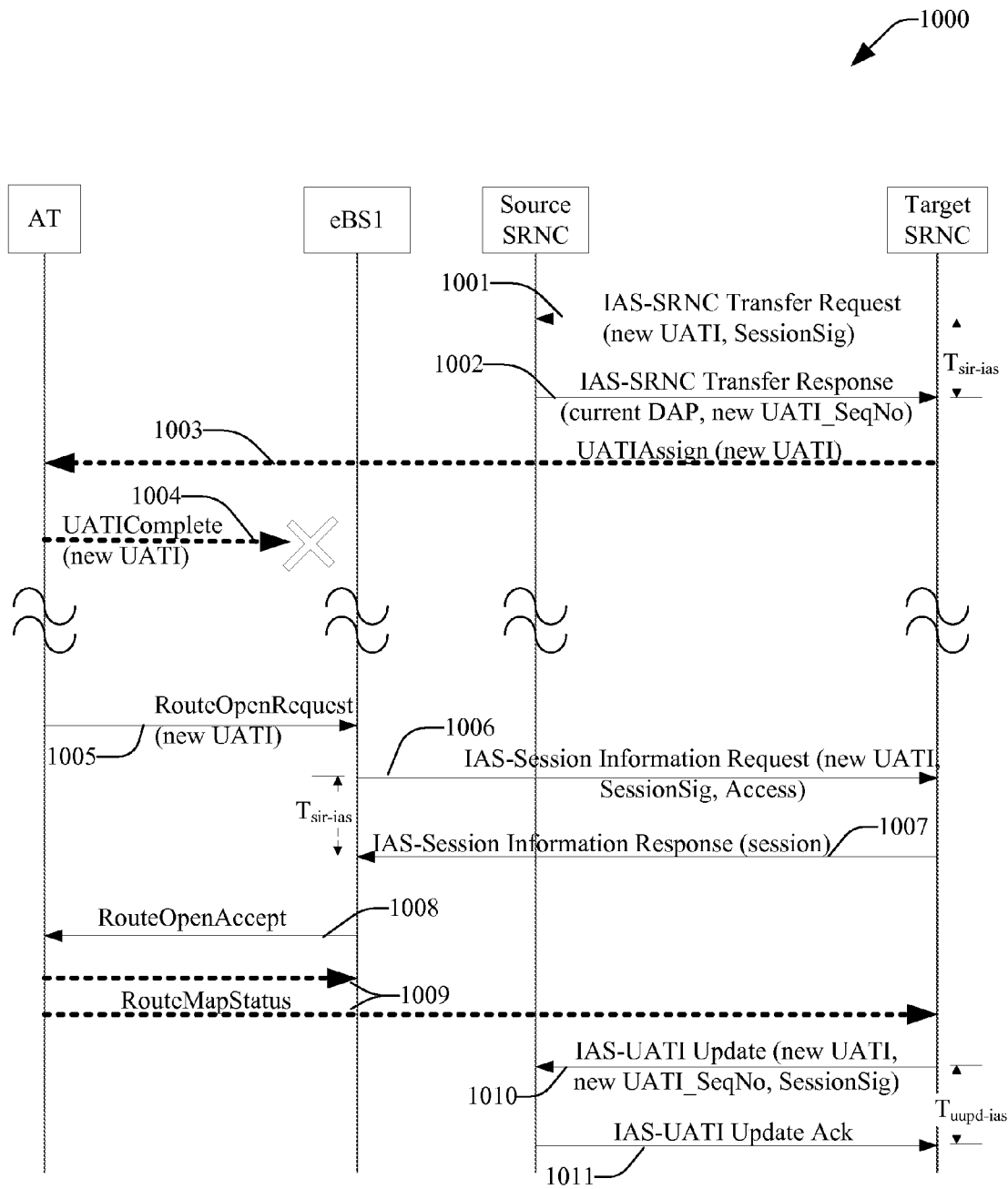
FIG. 10 illustrates a further exemplary aspect of a call flow, which describes a failure scenario for a session reference transfer where the UATIComplete message is lost.

FIG. 10 illustrates a further exemplary aspect of a call flow 1000, which describes a failure scenario for a session reference transfer where the UATIComplete message is lost. Such call flow 1000 assumes that the source SRNC and the target SRNC are already in the Route Set while eBS1 is not yet in the Route Set. Initially, at 1001, the target SRNC sends an IAS-SRNC Transfer Request message to the source SRNC to request a session reference transfer and starts timer $T_{str-ias}$. Next, at 1002, the source SRNC responds to the target SRNC with an IAS-SRNC Transfer Response message. This message contains the new UATI_SeqNo (for the new UATI). Upon receipt of the IAS-SRNC Transfer Response message, the target SRNC stops timer $T_{str-ias}$.

Subsequently, at 1003, the target SRNC sends UATIAssign message containing the new UATI to the AT. Next, at 1004, the AT sends a UATIComplete message to the target SRNC. However, as illustrated in FIG. 1000, the AT loses its connection before the message is delivered. During such period, if the source SRNC receives a Paging Request message, then the source SRNC shall initiate a paging procedure for the AT using the old PageID. It is to be appreciated that the AT monitors both the old PageID and the new PageID if the UATIComplete message has not been sent successfully. Moreover, if the UATIComplete message is not received, then the source SRNC and the target SRNC may release the new UATI once its session KeepAlive timer expires. At 1005, the AT accesses eBS1 by sending RouteOpenRequest message with the new UATI.

Next, at 1006, eBS1 sends an IAS-Session Information Request message with a flag indicating this is an access to the target SRNC and starts timer $T_{sir-ias}$. At 1007, and upon receipt of the IAS-Session Information Request message with the new UATI, the target SRNC unlocks the session and sends IAS-Session Information Response message to eBS1. The message contains the session of the AT. Upon receipt of the IAS-Session Information Response message, the eBS1 stops timer $T_{sir-ias}$.

Subsequently and at 1008, eBS1 sends a RouteOpenAccept message to the AT to complete route setup procedure. Next, at 1009, the AT sends a RouteMapStatus message to all ANRIs in the Route Set, including eBS1 and the target SRNC. At 1010, upon receipt of the IAS-Session Information Request message with the new UATI, the target SRNC sends an IAS-UATI Update message to the source SRNC and starts timer $T_{uupd-ias}$. Next, at 1011, upon receipt of the IAS-UATI Update message, the source SRNC sends an IAS-UATI Update Ack message to the target SRNC and may release the old UATI. Upon receipt of the UATI Update Ack message, the target SRNC stops timer $T_{uupd-ias}$. As such, the telecommunication system can recover during a failure scenario for a session reference transfer where the UATIComplete message is lost.

Figure 11:
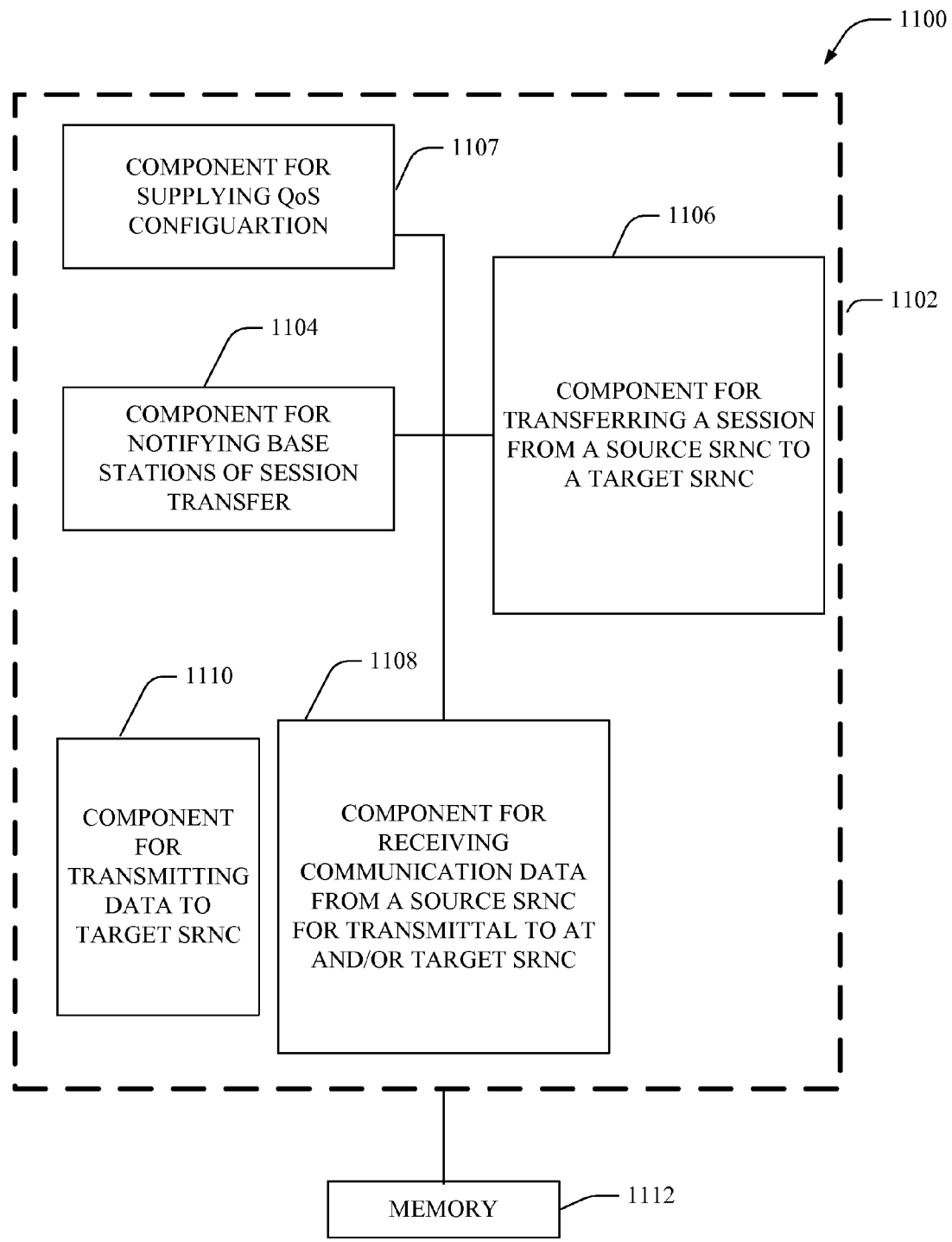
FIG. 11 illustrates a particular system that facilitates transfer for ownership of a session from a source SRNC to a target SRNC.

FIG. 11 illustrates a particular system 1100 that facilitates transfer for ownership of a session from a source SRNC to a target SRNC. The system 1100 can be associated with an access point and includes a grouping 1102 of components that can communicate with one another in connection with transfer of session ownership, and supplying updates to the UATI.

Grouping 1102 also includes a component 1106 for transferring a session from a source SRNC to a target. Such grouping can further include components for tracking session signatures (not shown) and a component for supplying QoS configuration 1107, wherein if a session is to be moved, such does not necessarily require moving the associated connection therewith. Grouping 1102 additionally includes a component 1108 for receiving communication data and/or message exchange from a source SRNC, wherein the data is desirably transmitted to the AT and/or target SRNC. Moreover, the communication data received from the AT can be an IP-encapsulated data packet that is associated with a sequence number or stamp. Grouping 1102 can further include a component 1110 for transmitting communication data (e.g., message exchange) to the target SRNC 1110 in an appropriate sequence. System 1100 can also include a memory 1112, which can retain instructions relating to executing components 1104-1110. The system 1100 further includes a component 1104 for notifying base stations and other units in communication with the AT of the session transfer and/or the identity of the target SRNC.

Figure 12:
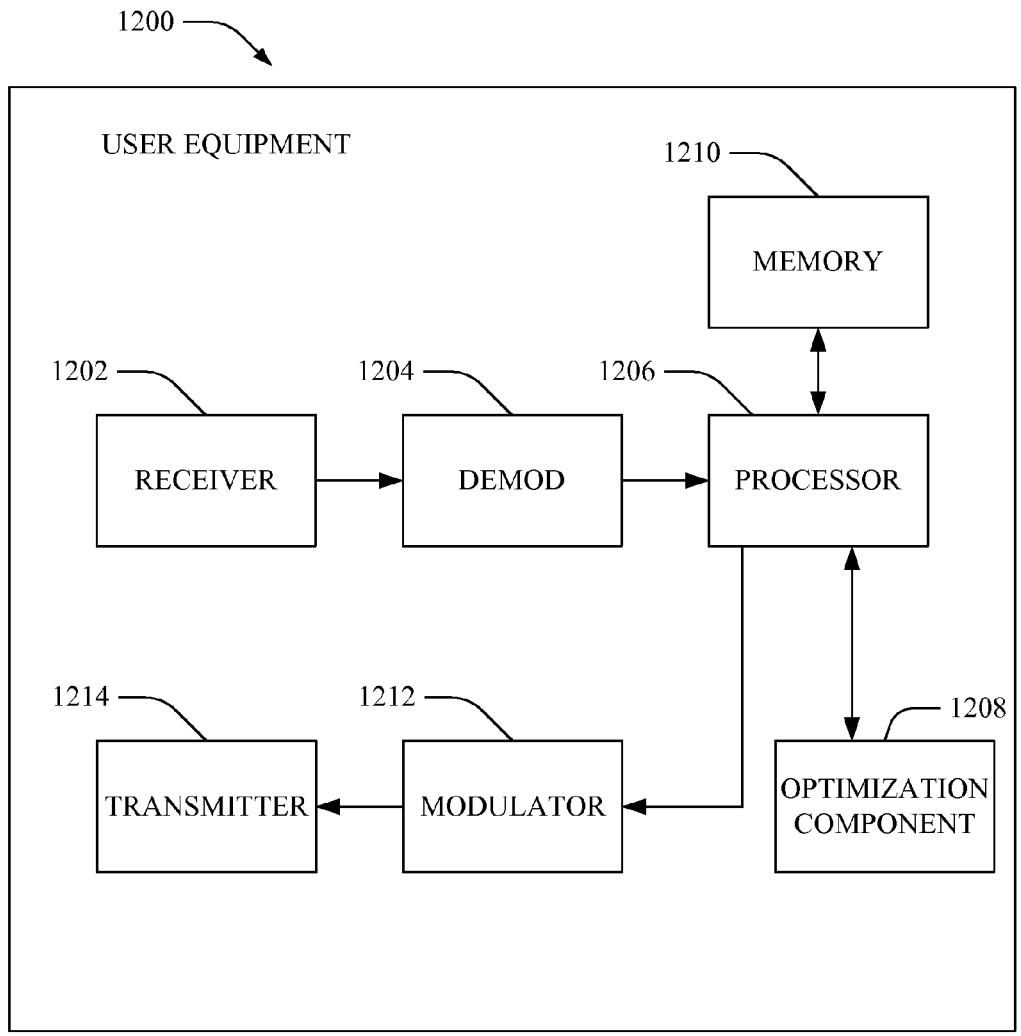
FIG. 12 illustrates a system that can be employed in connection with transmitting a session to a target SRNC according to an aspect.

FIG. 12 illustrates a system 1200 that can be employed in connection with interaction with a session transmitted to a target SRNC according to an aspect. System 1200 comprises a receiver 1202 that receives a signal from, for instance, one or more receive antennas, and performs typical actions thereon (e.g., filters, amplifies, downconverts, . . . ) the received signal and digitizes the conditioned signal to obtain samples. A demodulator 1204 can demodulate and provide received pilot symbols to a processor 1206 for channel estimation.

Processor 1206 can be a processor dedicated to analyzing information received by receiver component 1202 and/or generating information for transmission by a transmitter 1214. Processor 1206 can be a processor that controls one or more portions of system 1200, and/or a processor that analyzes information received by receiver 1202, generates information for transmission by a transmitter 1214, and controls one or more portions of system 1200. System 1200 can include an optimization component 1208 that can optimize performance of user equipment before, during, and/or after handoff. Optimization component 1208 may be incorporated into the processor 1206. It is to be appreciated that optimization component 1208 can include optimization code that performs utility based analysis in connection with determining whether to initiate session handoff from the source SRNC to the target SRNC system. The optimization code can utilize artificial intelligence based methods in connection with performing inference and/or probabilistic determinations and/or statistical-based determination in connection with performing handoffs.

System (user equipment) 1200 can additionally comprise memory 1210 that is operatively coupled to processor 1206 and that stores information such as signal strength information with respect to a base station, scheduling information, and the like, wherein such information can be employed in connection with determining whether and when to initiate and/or request a session handoff. Memory 1210 can additionally store protocols associated with generating lookup tables, etc., such that system 1200 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1210 is intended to comprise, without being limited to, these and any other suitable types of memory. Processor 1206 is connected to a symbol modulator 1212 and transmitter 1214 that transmits the modulated signal.

Figure 13:
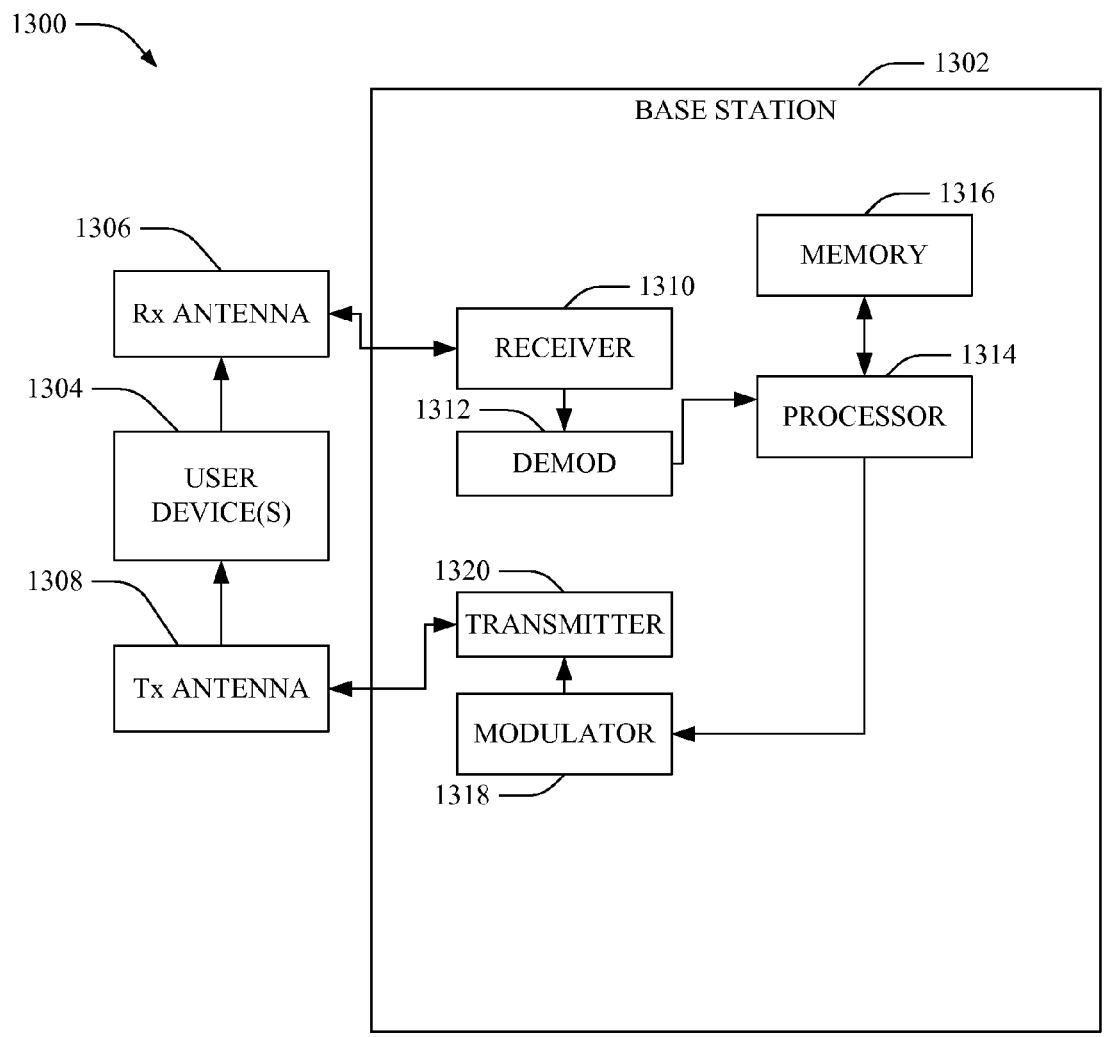
FIG. 13 illustrates exemplary base station functions that control the connection that allow the AT and the AN to communicate as part of a wireless system.

FIG. 13 illustrates base station functions, wherein the base stations control the connection, which represent an assignment of resources (e.g., dedicated resources) that allow an Access Terminal (AT) to communicate with an Access Network (AN). As illustrated, the system 1300 comprises a base station 1302 with a receiver 1310 that receives signal(s) from one or more user devices 1304 by way of one or more receive antennas 1306, and transmits to the one or more user devices 1304 through a plurality of transmit antennas 1308. In one example, receive antennas 1306 and transmit antennas 1308 can be implemented using a single set of antennas. Receiver 1310 can receive information from receive antennas 1306 and is operatively associated with a demodulator 1312 that demodulates received information. Receiver 1310 can be, for example, a Rake receiver (e.g., a technique that individually processes multi-path signal components using a plurality of baseband correlators, ... ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1314 that is similar to the processor described above with regard to FIG. 11, and is coupled to a memory 1316 that stores information related to user device assignments, lookup tables related thereto and the like. Receiver output for each antenna can be jointly processed by receiver 1310 and/or processor 1314. A modulator 1318 can multiplex the signal for transmission by a transmitter 1320 through transmit antennas 1308 to user devices 1304.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored as one or more instructions or code on a computer-readable medium. Computer-readable media includes computer storage media. A storage medium may be any available media that can be accessed by a computer. By way of example, such computer-readable media can comprise RAM, ROM, EEPROM, CD-ROM or other optical disk storage, magnetic disk storage or other magnetic storage devices, or any other similar medium that can be used to store desired program code in the form of instructions or data structures and that can he accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of active session handoff comprising:
identifying an active session and an Access Terminal (AT) to a base station, wherein a source session controller of the active session supports management of the active session with the AT via the base station, and wherein a Unicast Access Terminal Identifier(s) (UATI) is employed that notifies the base station regarding an identity of the active session; and
transferring ownership of the active session from the source session controller to a target session controller, wherein the target session controller manages the active session with the AT via the base station based on the transferring ownership of the active session and without interrupting a stream of data communicated between the AT and the base station, the ownership of the active session transferable independently of a connection associated therewith, and wherein the UATI is updated to designate the target session controller instead of the source session controller.

2. The method of claim 1 further comprising supplying a source Session Reference Network Controller (SRNC) as the source session controller, and a target SRNC as the target controller in 3GPP2 systems.

3. The method of claim 2 further comprising renegotiating the active session with the target SRNC, upon completion of session transfer.

4. The method of claim 2 further comprising receiving an SRNC transfer request by the source SRNC, to initiate session transfer.

5. The method of claim 2 further comprising supplying sequence numbers of the UATI to base stations, to facilitate identification of the active session.

6. The method of claim 2 further comprising locking the active session by the source SRNC, to reject a session modification during session transfer.

7. The method of claim 6 further comprising unlocking the active session upon completion of assigning the UATI from the target SRNC to the AT.

8. The method of claim 2 further comprising announcing transfer of session ownership to all entities that are in communications with the AT.

9. The method of claim 1, further comprising sending a paging message by the source session controller subsequent to initiating transfer of ownership of the active session to the target session controller.

10. The method of claim 1, wherein at least a portion of the UATI changes in connection with transferring ownership of the active session.

11. The method of claim 1, further comprising releasing the UATI by the source session controller and the target session controller in response to detecting that the AT has not acknowledged transfer of the active session.

12. At least one processor configured to supply active session handoff comprising:
a first module for identifying an active session and an Access Terminal (AT) to a base station, wherein a source session controller of the active session supports management of the active session with the AT via the base station, and wherein a Unicast Access Terminal Identifier(s) (UATI) is employed that notifies the base station regarding an identity of the active session, and
a second module for transferring ownership of the active session from the source session controller to a target session controller, wherein the target session controller manages the active session with the AT via the base station based on the transferring ownership of the active session and without interrupting a stream of data communicated between the AT and the base station, the ownership of the active session transferable independently of a connection associated therewith, and wherein the UATI is updated to designate the target session controller instead of the source session controller.

13. A computer program product including a non-transitory computer-readable medium having computer code stored thereon, the computer code comprising:
a first set of codes for causing a computer to identify an active session and an Access Terminal (AT) to a base station, wherein a source session controller of the active session supports management of the active session with AT via the base station, and wherein a Unicast Access Terminal Identifier(s) (UATI) is employed that notifies the base station regarding an identity of the active session; and
a second set of codes for causing the computer to transfer ownership of the active session from the source session controller to a target session controller, wherein the target session controller manages the active session with the AT via the base station based on the transferring ownership of the active session, without interrupting a stream of data communicated between the AT and the base station, the ownership of the active session transferable independently of a connection associated therewith, and wherein the UATI is updated to designate the target session controller instead of the source session controller.

14. An apparatus comprising:
means for identifying an active session and an Access Terminal (AT) to a base station, wherein a source session controller of the active session supports management of the active session with the AT via the base station, and wherein a Unicast Access Terminal Identifier(s) (UATI) is employed that notifies the base station regarding an identity of the active session; and
means for transferring ownership of the active session from the source session controller to a target session controller, wherein the target session controller manages the active session with the AT via the base station based on the transferring ownership of the active session and without interrupting a stream of data communicated between the AT and the base station, the ownership of the active session transferable independently of a connection associated therewith, and wherein the UATI is updated to designate the target session controller instead of the source session controller; and
means for notifying the base station regarding transfer of the active session.

15. A method of active session transfer comprising:
identifying an active session and an Access Terminal (AT) to a base station, wherein a source session controller of the active session supports management of the active session with the AT via the base station, and wherein a Unicast Access Terminal Identifier(s) (UATI) is employed that notifies the base station regarding an identity of the active session; and
receiving ownership of the active session by a target session controller as a result of a session transfer from the source session controller, wherein the target session controller manages the active session with the AT via the base station based on the session transfer and without interrupting a stream of data communicated between the AT and the base station, the ownership of the active session transferable independently of a connection associated therewith, and wherein the UATI is updated to designate the target session controller instead of the source session controller.

16. The method of claim 15 further comprising supplying a source Session Reference Network Controller (SRNC) as the source session controller, and a target SRNC as the target controller in 3GPP2 systems.

17. The method of claim 16 further comprising renegotiating the active session with the target SRNC, upon completion of session transfer.

18. The method of claim 16 further comprising sending an SRNC transfer request by the target SRNC to the source SRNC.

19. The method of claim 16 further comprising paging the AT via at least one of a page identifier assigned by the source SRNC and a page identifier assigned by the target SRNC.

20. The method of claim 16 further comprising locking the active session by the source SRNC, to reject a session modification.

21. The method of claim 20 further comprising unlocking the active session upon designation of the target SRNC.

22. The method of claim 15 further comprising announcing transfer of session ownership to all entities that are in communications with the AT.

23. A computer implemented system comprising:
a wireless access terminal operable to identify an active session and an Access Terminal (AT) to a base station, wherein a source Session Reference Network Controller (SRNC) supports management of the active session with the AT via the base station, and wherein a Unicast Access Terminal Identifier(s) (UATI) is employed that notifies the base station regarding an identity of the active session;
a session transfer component operable to transfer ownership of the active session from the SRNC to a target SRNC, wherein the target SRNC manages the active session with the AT via the base station based on the transferring ownership of the active session and without interrupting a stream of data communicated between the AT and the base station, the ownership of the active session transferable independently of a connection associated therewith, and wherein the UATI is updated to designate the target session controller instead of the source session controller.

24. A system for wireless communication comprising:
a memory unit that supplies instructions for switching an active session between a source Session Reference Network Controller (SRNC) and a target SRNC, wherein the source SRNC supports management of the active session with an access terminal (AT) via a base station, and wherein a Unicast Access Terminal Identifier(s) (UATI) is employed that notifies the base station regarding an identity of the active session; and
a processor unit that executes instructions for switching ownership of the active session between the source SRNC and the target SRNC without interrupting a stream of data communicated between the AT and the base station, wherein the target SRNC manages the active session with the AT via the base station used by the source SRNC to support management of the active session with the AT based on the switching ownership of the active session, the ownership of the active session transferable independently of a connection associated therewith, and wherein the UATI is updated to designate the target session controller instead of the source session controller.

25. A communications system comprising:
means for identifying an active session and an Access Terminal (AT) to a base station, wherein a source Session Reference Network Controller (SRNC) of the active session supports management of the active session with the AT via the base station, and wherein a Unicast Access Terminal Identifier(s) (UATI) is employed that notifies the base station regarding an identity of the active session;
means for transferring ownership of the active session from the source SRNC to the target SRNC without interrupting a stream of data communicated between the AT and the base station, wherein the target SRNC manages the active session with the AT via a base station used by the source SRNC to support management of the active session with the AT based on the transferring ownership of the active session, the ownership of the active session transferable independently of a connection associated therewith, and wherein the UATI is updated to designate the target session controller instead of the source session controller; and
means for notifying the base station regarding session transfer to the target SRNC.

26. A method of wireless communication system, the method comprising:
receiving an Internet Authentication Service-Session Reference Network Controller (IAS-SRNC) transfer request message by a source Session Reference Network Controller (SRNC) for request of an active session reference transfer to a target SRNC, wherein the source SRNC supports management of the active session with an access terminal (AT) via a base station, and wherein a Unicast Access Terminal Identifier(s) (UATI) is employed that notifies the base station regarding an identity of the active session; and
sending an IAS-SRNC transfer response message by the source SRNC that includes information to update the UATI to facilitate active session ownership transfer to the target SRNC independently of a connection associated therewith and without interrupting a stream of data communicated between an Access Terminal (AT) and a base station, wherein the target SRNC manages the active session with the AT via the base station used by the source SRNC to support management of active session with the AT.

27. The method of claim 26 further comprising locking an active session to reject modification thereof.

28. The method of claim 26 further comprising sending Internet Authentication Service-Unicast Access Terminal Identifier(s) (IAS-UATI) Update Ack message by the source SRNC to the target SRNC, to facilitate session transfer.

29. The method of claim 26 further comprising stopping or starting timers during message exchange, to manage response times.

30. The method of claim 26 further comprising notifying the base station for transfer of the active session to the target SRNC.

* * * * *